United States Patent [19]

Wood et al.

[11] Patent Number: 4,506,570

[45] Date of Patent: Mar. 26, 1985

[54] LATHE APPARATUS ESPECIALLY FOR BRAKE DRUMS AND DISCS

[76] Inventors: Charles L. Wood, 2439 Hoyt St., Winston-Salem, N.C. 27103; Clarence E. Benton, 2466 Hallmark Dr., Florence, S.C. 29501

[21] Appl. No.: 361,406

[22] Filed: Mar. 24, 1982

[51] Int. Cl.³ .............................................. B23B 5/02
[52] U.S. Cl. ...................................................... 82/4 A
[58] Field of Search ................. 82/4 A, 21 R, 21 B, 82/24 R, 22; 409/233; 408/4, 710

[56] References Cited

U.S. PATENT DOCUMENTS

| | | | |
|---|---|---|---|
| 367,246 | 7/1887 | Slayton | 82/21 R |
| 610,981 | 9/1898 | Whiton | 82/21 R |
| 1,095,278 | 5/1914 | Hoepfner | 82/21 R |
| 2,134,024 | 10/1938 | Bogart | 82/21 B |
| 2,172,999 | 9/1939 | Hoelscher | 82/21 B |
| 2,257,493 | 9/1941 | Blazek et al. | 82/4 A |
| 2,585,217 | 2/1952 | Bickel et al. | 82/21 B |
| 2,843,024 | 7/1958 | Armitage et al. | 409/156 |
| 2,882,800 | 4/1959 | Stephan | 409/156 |
| 3,903,765 | 9/1975 | Morse | 82/21 R |
| 4,140,032 | 2/1979 | Besenbruch et al. | 82/4 A |
| 4,159,660 | 7/1979 | Buckley et al. | 82/21 B |
| 4,165,662 | 8/1979 | Besenbruch et al. | 82/4 A |

FOREIGN PATENT DOCUMENTS

| | | | |
|---|---|---|---|
| 1378424 | 4/1964 | France | 82/4 A |
| 1531111 | 1/1978 | United Kingdom | 409/233 |

OTHER PUBLICATIONS

Joseph Shigley Mechanical Engineering Design p. 543, Third Edition 1977.

Primary Examiner—Leonidas Vlachos
Assistant Examiner—Jerry Kearns
Attorney, Agent, or Firm—Wigman & Cohen

[57] ABSTRACT

A special purpose lathe apparatus, especially adapted for machining automotive components, such as brake drums and discs, is disclosed. The lathe includes a housing rotatably supporting a workpiece spindle driven by an electric motor. A pair of substantially identical tool slide modules are mounted on the housing at right angles to each other. Each slide module has a slide element which is movable selectively manually by a handwheel or automatically by a servomotor independently of the spindle drive motor. Only one servomotor is operable with the drive motor at any time.

5 Claims, 10 Drawing Figures

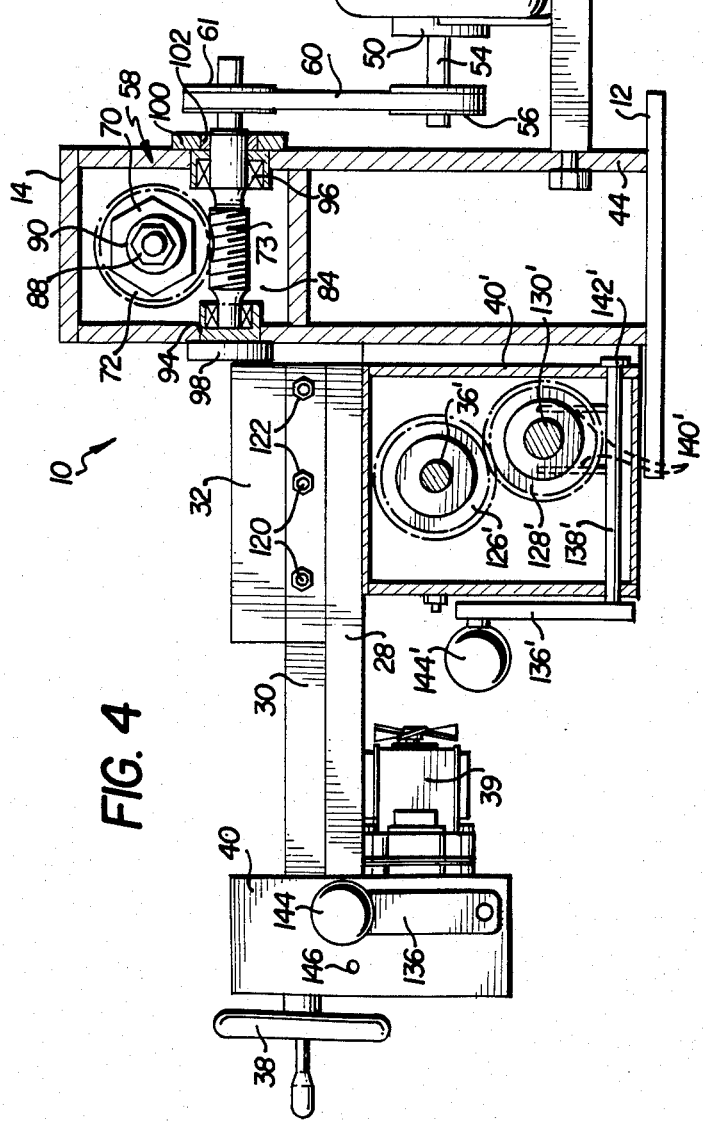
FIG. 4
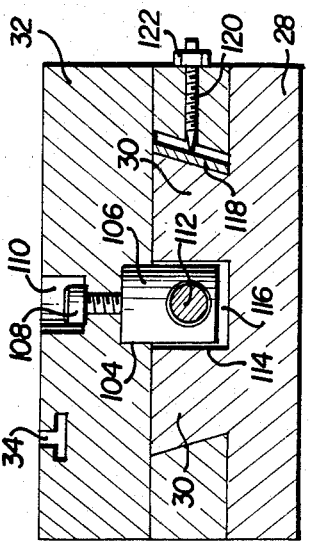
FIG. 6
FIG. 8
FIG. 7

LATHE APPARATUS ESPECIALLY FOR BRAKE DRUMS AND DISCS

BACKGROUND OF THE INVENTION

The present invention relates to metal turning apparatus and more particularly to a portable special purpose lathe for machining the friction surfaces of brake drums and brake discs or for boring, facing and turning surfaces of other components, particularly automotive parts, such as flywheels, starters and generator armatures, alternator slip rings, small shafts and the like.

A search of the prior art failed to uncover any prior art references which disclose the special purpose lathe of the present invention. A number of patents were uncovered which disclose various types of metal turning machines, including special purpose lathes for turning brake drums and discs. The following is a listing of the patents uncovered during the aforementioned search:

| U.S. Pat. No. | Patentee | Issue Year |
| --- | --- | --- |
| 1,820,717 | Wadell | 1931 |
| 2,357,803 | Barrett | 1944 |
| 2,663,975 | Barrett | 1953 |
| 2,891,435 | Billeter | 1959 |
| 2,960,765 | Barrett | 1960 |
| 3,049,953 | Barrett | 1962 |
| 3,075,413 | Healy et al | 1963 |
| 3,221,578 | Parsons et al | 1965 |
| 3,555,940 | Cooper | 1971 |
| 3,691,880 | Ratteree et al | 1972 |
| 3,724,327 | Gillberg | 1973 |
| 3,871,066 | Mitchell | 1975 |
| 4,165,662 | Besenbruch et al | 1979 |
| 4,215,603 | Jones | 1980 |
| 4,253,359 | Youden | 1981 |

U.S. Pat. Nos. 3,871,066 and 4,165,662 disclose lathe machines and attachments for turning or grinding the friction surfaces of either a brake drum or a brake disc. However, the machines disclosed in those patents are not adapted for rapid changeover from a configuration for machining brake drums to a configuration for machining brake discs.

U.S. Pat. Nos. 2,663,975; 2,960,765; and 3,049,953 to Barrett disclose portable brake drum lathes each having an automatic tool feed which is driven via a drive transmission from the spindle motor.

U.S. Pat. Nos. 3,221,578 and 4,253,359 disclose complex metal turning machine tools having programmable mechanisms for powering the tool drives or slides of the machine for compound movement of the tools. Because of their complexity, the machines of these patents are not particularly suited for use as special purpose lathes for turning brake drums, brake discs and other automotive components.

The conventional special purpose lathes for turning brake drums and discs described in the aforesaid patents, such as the compact portable machines taught by Barrett and others, employ either manual tool feeds or a combination of a manual cross-feed and an automatic tool feed operable parallel to the spindle axis. Typically, in such special purpose machines, the automatic tool feed mechanism is driven via a gear train or other transmission means from the main spindle motor and thus requires a spindle motor with a relatively large horsepower rating. In addition, as previously noted, the conventional special purpose lathes for machining brake and other automotive components are not readily convertible between arrangements for the machining of brake drums and brake discs.

SUMMARY AND OBJECTS OF THE INVENTION

In view of the foregoing limitations and shortcomings of the prior art devices, as well as other disadvantages not specifically mentioned above, it should be apparent that there still exists a need in the art for a lathe apparatus which is capable of being operated to machine both brake drums and brake discs without the need for special tool feed attachments or for modification of the tool feed mechanisms of the apparatus. It is, therefore, a primary objective of this invention to fulfill that need by providing a highly versatile special purpose lathe apparatus which is especially constructed for the turning of either brake drums or discs, as well as many other automotive components.

More particularly, it is an object of this invention to provide a compact lathe apparatus of remarkably simple construction which is characterized by two, substantially identical, independently operable servomotor-driven tool feed mechanisms or slide modules arranged at right angles to one another and mounted adjacent the workpiece spindle.

It is another object of the present invention to provide a special purpose lathe for machining automotive components, especially brake drums and discs, said lathe having an automatic, two-axis tool feed mechanism which is powered completely independently of the main spindle motor.

Yet another object of the present invention is to provide a brake lathe apparatus of rugged, reliable and economical construction which has a minumum number of moving parts.

Still another object of this invention is to provide a brake lathe apparatus which is easy to operate and is, therefore, especially suited for use by automobile mechanics, as well as those of even less mechanical skills.

Briefly described, the aforementioned objects are accomplished according to the invention by providing a lathe machine having a housing which supports a rotatable main spindle driven by a resiliently-mounted electric motor via a simple pulley and V-belt arrangement and a worm and worm wheel attached to the spindle shaft. A pair of identical tool slide assemblies or modules are mounted at right angles to one another on a cantilevered support on the machine housing adjacent the spindle end thereof. The slide modules provide tool feed both (1) parallel to the main spindle axis for machining, for instance, brake drum surfaces; and (2) perpendicular to the main spindle axis for machining, for example, brake disc surfaces.

Each slide module is constructed with a dovetailed slide element which is movable by a lead screw rotated selectively by either a graduated hand wheel connected to the lead screw shaft or a servomotor drivingly engaged with the lead screw by means of a simple gear train having a manual engage-disengage mechanism. The use of an independent servomotor for automatic movement of the slide element of each module rather than a drive train connected to the spindle motor permits the use of a lower power spindle motor and, thus, reduces overall machine cost and complexity.

The two servomotors (one for each slide module) and the main spindle motor are controlled by means of a single electrical switch, namely, a four-pole, double-throw switch with center off position. The motors are wired to the switch such that in one operating switch position power is transmitted to the main spindle motor and a first one of the servomotors and in the other operating switch position power is transmitted to the main spindle motor and a second one of the servomotors. In that way, only one servomotor can be electrically powered at any one time so that automatic compound tool movement, i.e., simultaneous movement in both the X and Y axes, is not possible with the lathe apparatus of the present invention. Such operating arrangement is particularly preferred in a machine for turning both brake drums and brake discs wherein automatic tool feed movement in only one direction (X or Y) at a time is essential for proper operation.

The main spindle comprises a hollow shaft constructed to receive one of a plurality of interchangeable arbors or workpiece holders. A conical female socket is provided on the end of the spindle and the threaded end of a drawbar extends through the hollow spindle into the conical socket and is threadably engaged to the end of a conical mating element provide on the end of each arbor. The mating conical surfaces provide good arbor to spindle alignment and high frictional driving engagement is possible by means of the drawbar arrangement.

With the foregoing and other objects, advantages and features of the invention that will become hereinafter apparent, the nature of the invention may be more clearly understood by reference to the following detailed description of the invention, the appended claims and to the several views illustrated in the attached drawings.

BRIEF DESCRIPTION OF THE DRAWINGS

FIG. 4 is an end elevation view, party in section, illustrating the spindle drive arrangement and the engage-disengage mechanism of the lathe apparatus of the present invention;

FIG. 6 is a cross-sectional view taken along line 6—6 of FIG. 2;

FIGS. 7 and 8 illustrate alternate arbor attachments for the main spindle; and

DETAILED DESCRIPTION OF A PREFERRED EMBODIMENT

Figure 1:
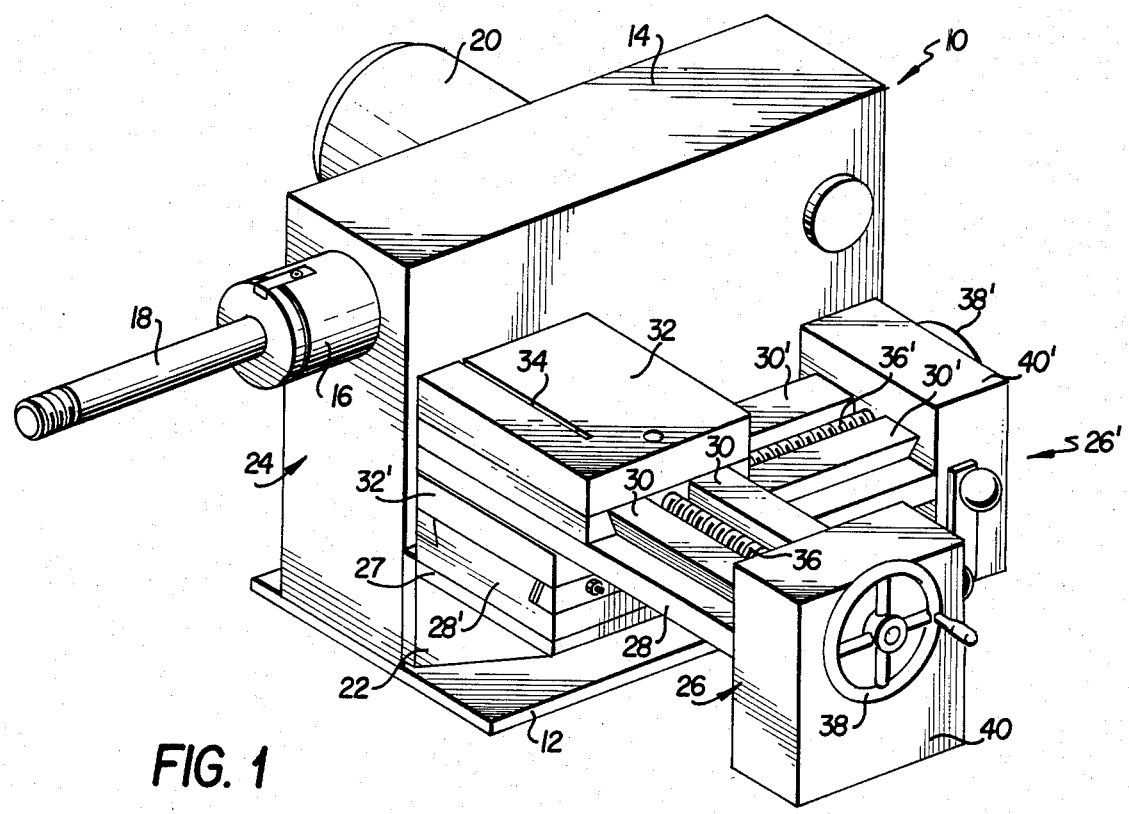
FIG. 1 is a perspective view illustrating the lathe apparatus of the present invention.

Referring now in detail to the drawings wherein like parts are designated by like reference numerals throughout, there is illustrated in FIG. 1 a lathe apparatus according to the present invention which is designated generally by reference numeral 10. The lathe apparatus 10 comprises a base plate 12 upon which is mounted a generally rectangular elongated housing 14 which supports a main spindle 16 and a workpiece holder or arbor 18 at the uppermost portion thereof. An electrical motor 20 for driving the main spindle 16 is resiliently mounted on the far side of the housing 14 as viewed in FIG. 1 in a manner to be described in greater detail hereinafter.

A mounting bracket 22 is secured by means of suitable bolts 23 (FIG. 3) to the near side of the housing 14 as viewed in FIG. 1 adjacent the spindle end 24 of the housing. A pair of identically constructed tool feed mechanisms or slide modules 26, 26' are securely affixed in cantilever fashion to the top plate 27 of the bracket 22.

Each slide module 26, 26' comprises an elongated base 28, 28' with spaced dovetail ways 30, 30' formed on the top surface thereof. A slide element 32, 32' having a dovetail groove on the underside thereof mates with and is slidable along the dovetail ways 30, 30' of the base 28, 28'. Means 34, preferably comprising a T-slot, are provided on the uppermost slide element 32 for securing a cutting tool (not shown) thereto.

Each slide element 32, 32' is movable along its respective dovetail ways 30, 30' by means of a lead screw 36, 36'. Lead screw 36, 36' is rotated either manually by means of a hand wheel 38, 38' mounted to the end of the lead screw or by a servomotor 39, 39' (FIGS. 3 and 4) arranged beneath the base 28, 28' and mounted to the end housing 40, 40'. Housing 40, 40' encloses and supports a mechanism for engaging and disengaging the servomotor 39, 39' with the lead screw 36, 36' as described more fully hereinafter.

Figure 2:
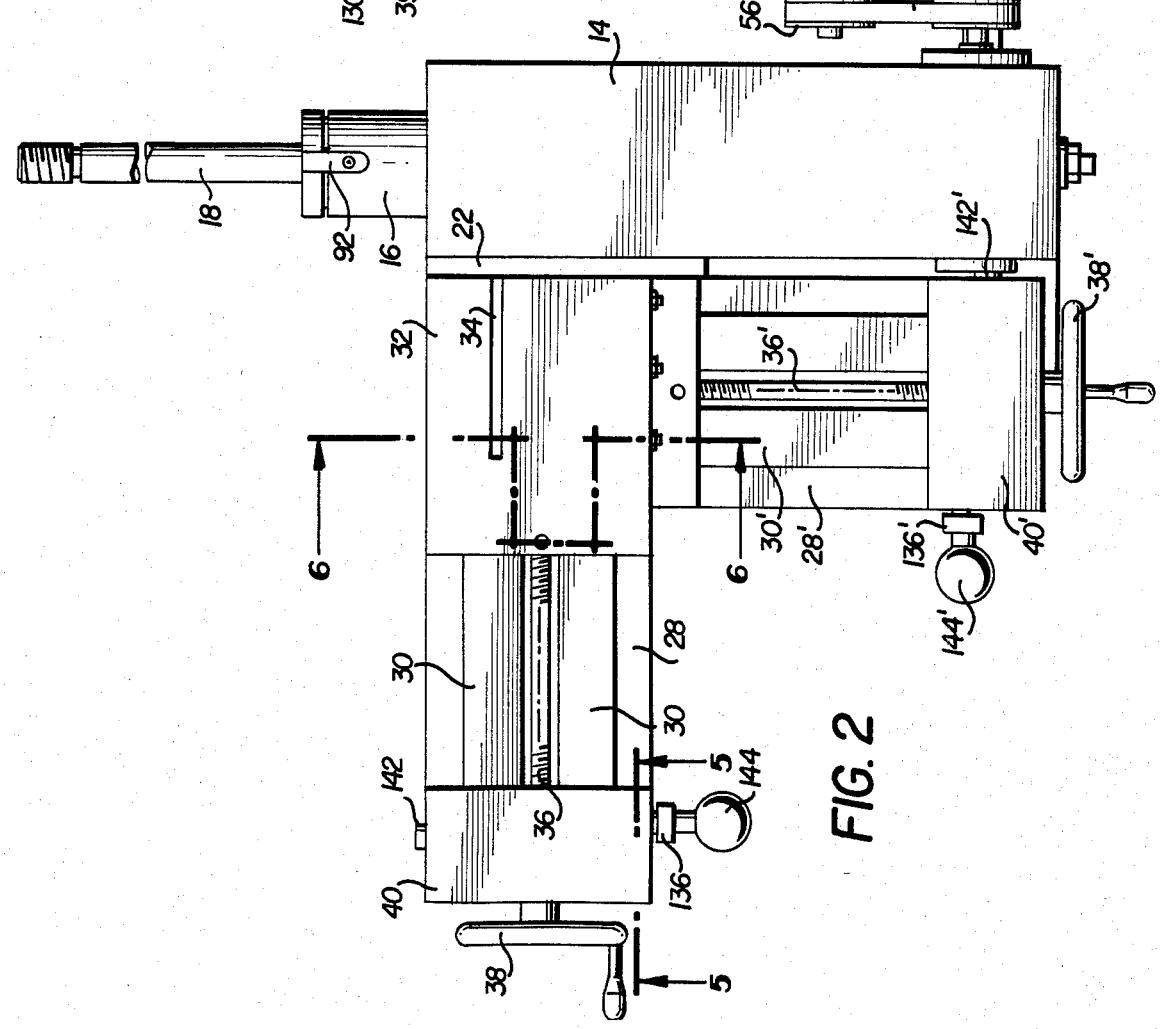
FIG. 2 is a top plan view of the lathe apparatus of the present invention.

FIGS. 2 and 4 best illustrate the manner in which the main drive motor 20 is resiliently mounted to the machine housing 14. A cylindrical bar 42 is mounted to the rear plate 44 of the housing 14 such that the bar is rotatable about its longitudinal axis. A cantilever plate 46 is welded along the side of the bar 42 and supports the motor 20 in a resilient cradle base 48 of conventional construction which is bolted to the plate 46. Essentially, the cradle base 48 is a U-shaped sheet metal bracket having a pair of rubber motor mounts 50, 52 for resiliently supporting the motor 20 at the opposite ends thereof. The motor shaft 54 is provided with a pulley 56 which is connected to the main spindle drive assembly 58 by means of a V-belt 60 and another pulley 61.

It should be apparent to those skilled in the art that the above-described motor mounting arrangement permits the motor to pivot about the axis of the bar 42 and thus apply tension to the V-belt 60. It has been found that the weight of the motor alone is generally sufficient to provide the correct tension in the V-belt which assures optimum belt and bearing life. Moreover, the pivoting arrangement of the motor renders belt changes a simple task and variations in belt length are readily changes a simple task and variations in belt length are readily accommodated.

Figure 3:
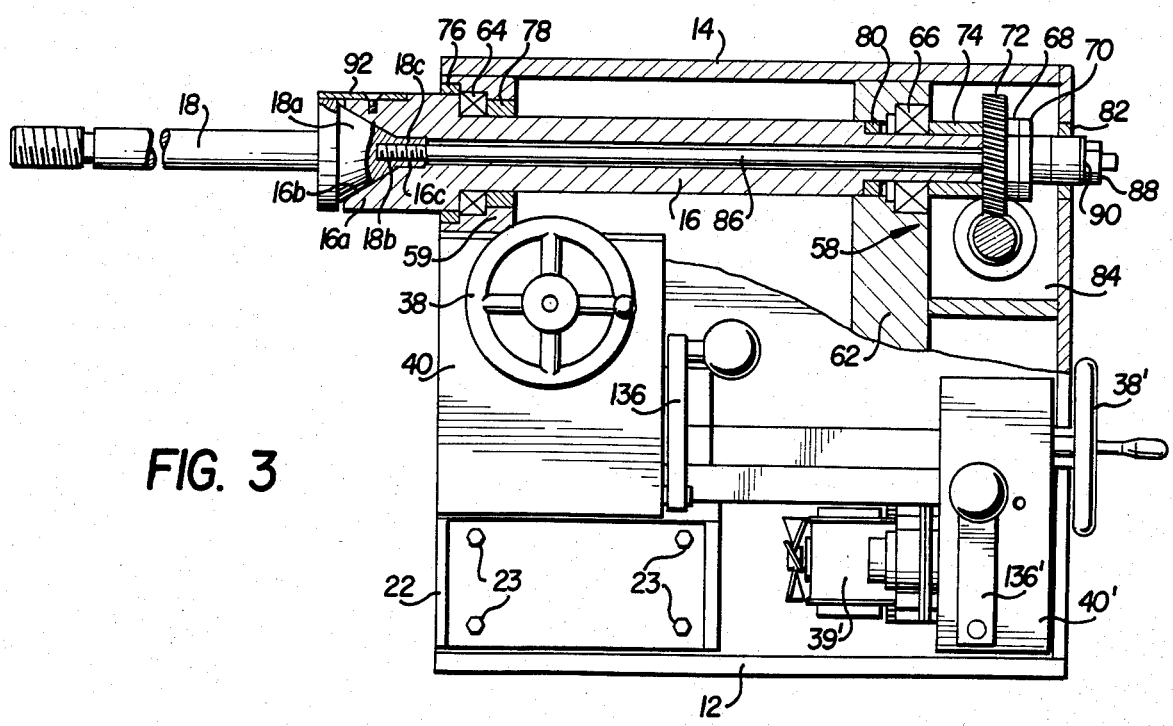
FIG. 3 is a side elevation view, partly broken away and sectioned to illustrate the structure of the main spindle of the lathe apparatus of the present invention.

Referring now to FIG. 3, it will be seen that the main spindle 16 comprises an elongated hollow shaft having a stepped outer diameter. The spindle extends through the entire length of the housing 14 and is rotatably mounted in bores provided in spaced support plates 59, 62 by opposed tapered roller bearings 64, 66 which provide high load bearing capacity in a minimum space. Undesired axial and radial play of the spindle in the bearings is readily eliminated by means of an adjusting nut 68 and jam nut 70 acting through worm wheel 72 and sleeve 74 to urge the bearings 64, 66 toward one another. Bearing wear can also be compensated by means of the same arrangement of the adjusting and jam nuts 68, 70.

Seals 76, 78 are mounted in the support plate 59 on both sides of bearing 64. Seals 80, 82 are also provided at the drive assembly end of the spindle for retaining lubricant in the oil reservoir 84.

The elongated end 16a of the main spindle 16 comprises a female conical socket 16b in which the male conical end 18a of the arbor 18 is matingly received. A drawbar 86 extends through the hollow spindle shaft and is threadably engaged in a blind, threaded axial bore 18b provided in the male conical part 18a of the arbor. A tension nut 88 and washer 90 are provided on the opposite end of the drawbar 86 for taking tension on the drawbar to thereby cause the conical arbor part 18a to be firmly engaged in the conical spindle socket 16b.

A cylindrical counterbore 16c in the spindle socket 16b provides initial alignment of the arbor 18 by guidingly receiving the pilot end 18c of the arbor. The included acute angle of the mating conical part is preferably about 60° and advantageously provides (1) excellent coaxial alignment of the spindle and arbor; (2) substantial rotational driving force between the spindle and arbor by reason of the large area of frictional contact between the mating conical parts; and (3) ready disengagement of the arbor from the spindle. A positive driving lug 92 may also be provided between the spindle end 16a and the arbor part 18a to ensure that there is no slippage between the spindle and arbor.

As best seen in FIGS. 3 and 4, the spindle drive assembly 58 comprises a worm shaft 73 rotatably driven by the motor 20 via pulley 56, V-belt 60, pulley 61 and the worm wheel 72 which is non-rotatably fixed to the spindle 16 by a key (not shown). A four-lead worm and matching worm wheel assembly is preferred over the single- or double-lead worm, because a four-lead worm gear assembly provides greater power transmitting efficiency than designs with fewer worm starts. In addition, the four-lead worm gear assembly is preferably not a self-locking design and thus helps prevent excessive tightening of the drawbar nut 90 which could affect arbor/spindle alignment and introduce excessive distortion in the workpiece.

The worm shaft 73 is rotatably supported in spaced ball bearings 94, 96 mounted in bearing block collars 98, 100. A lip seal 102 is provided about the worm shaft 73 at the location where the shaft penetrates the housing 14 to prevent leakage of lubricating oil from the reservoir 84.

Considering now the slide modules 26, 26' in greater detail, as previously mentioned, the modules are of substantially identical construction, the differences being primarily in the positioning of the various elements of the modules for the most convenient and efficient assembly and operation. In the following, only one of the slide modules will be described and, to the extent any differences in construction are significant to the understanding of the invention, such differences will be pointed out.

Referring to FIG. 6, which is a cross-section taken along line 6—6 of FIG. 2, the base 28 of the module 26 is shown with the dovetail ways 30 machined integrally therewith, for example, by a milling operation. It will be understood, however, that the dovetail ways could be formed as pieces separate from the base 28 and bolted thereto.

On the underside of the slide element 32, there is provided a counterbore 104 in which is fitted a lead screw nut 106, preferably made of brass. Nut 106 is secured in the counterbore 104 by a cap screw 108 which passes through a counterbored hole 110 in slide element 32. Nut 106 has a diametrical threaded bore 112 for receiving the lead screw 36. The lead screw nut 106 extends downwardly into a slot 114 formed between the dovetail ways 30, for example, by a milling operation. Preferably, the slot 114 does not extend the entire length of the base 28 and dovetail ways 30, but terminates in a semicylindrical end wall 116 which functions as a positive limit stop for the lead screw nut 106 to prevent disengagement of the nut from the lead screw. To adjust for wear of the dovetail connection between the slide element 32 and base 28, a metal wear strip 118 is provided along the inclined surface of one or the other of the dovetail ways 30. A plurality of pointed adjusting screws 120 with locking nuts 122 are threaded through bores in the depending part 124 of the slide element and engage in small surface indentations in the wear strip 118.

Figure 5A:
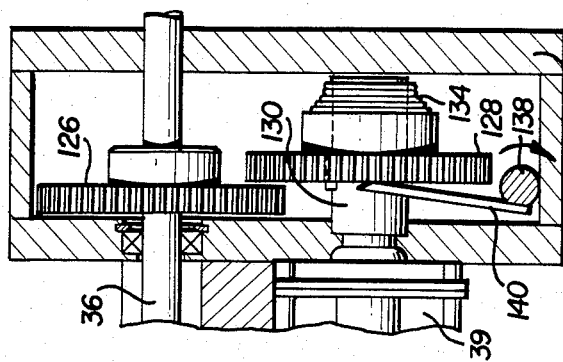
FIGS. 5A and 5B are fragmentary cross-sectional views taken along line 5—5 of FIG. 2 illustrating the two positions of the servomotor engage-disengage mechanism.
Figure 5B:
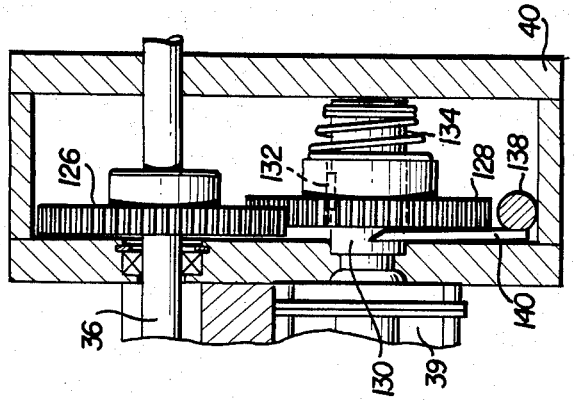

FIGS. 4, 5A and 5B illustrate the construction and operation of the mechanisms for engaging and disengaging the connection between the servomotor 39 and the lead screw 36. The engage/disengage mechanism comprises a spur gear 126 rigidly affixed to the shaft of the lead screw 36 by means of a set screw or the like and a similar spur gear 128 non-rotatably affixed to, but axially slideable along, the drive shaft 130 of the servomotor 39. A key 132 arranged in a keyway of shaft 130 permits axial movement of gear 128, but prevents relative rotation between the shaft 130 and gear 128.

In the position shown in FIG. 5B, spur gear 128 is engaged with spur gear 126 so that when the servomotor 39 is operated the lead screw shaft 36 will rotate and move the slide element 32 along the dovetail guideways 30 in a direction parallel to the lead screw axis and transversely of the spindle axis. A conical spring 134 arranged coaxially about the shaft 130 functions to urge the spur gear 128 toward the engaged position of FIG. 5B.

Disengagement of the spur gear 128 from spur gear 126 to the position shown in FIG. 5A is accomplished by a gear shift mechanism comprising a shift lever 136 (FIGS. 2-4) connected to a rotatable shift lever shaft 138 having welded or otherwise affixed thereto a pair of fingers or a yoke 140 which extends between the spur gear 128 and the wall of housing 40 adjacent the servomotor 39. Rotation of the shift lever shaft 138 clockwise as viewed in FIG. 5B causes the yoke 140 to bear upon the spur gear 128 and urge the same axially out of meshing engagement with spur gear 126 to the position shown in FIG. 5A.

As best seen in FIG. 4, the shaft 138' extends through aligned holes in the opposite walls of housing 40' and is secured against axial movement by a set collar 142' and the shift lever 136'. Conventional spring-loaded detent knobs 144, 144' are secured to the end of each shift lever 136, 136'. A detent hole 146 is provided in each housing 40, 40' for engagement of the knob detent thereby permitting locking of the gear shift mechanism in the disengaged position shown in FIG. 5A.

From the foregoing, it should be apparent that when the spur gears 126, 128 are enmeshed as shown in FIG. 5B, the rotation of the servomotor 39 is transmitted to the lead screw 36. To disengage the servomotor 39 from the lead screw 36, the shift lever 136 is pivoted to its detent position which, in turn, rotates shaft 138 clockwise as viewed in FIGS. 5A and 5B causing yoke 140 to bear against the surface of gear 128 thereby forcing the same to disengage gear 126 and simultaneously compress the spring 134 as shown in FIG. 5A. To again engage the servomotor 39 with the lead screw, shift lever 136 is pivoted to rotate shaft 138 counterclockwise permitting the conical compression spring 134 to smoothly force the sliding spur gear 128 into engagement with the spur gear 126 on the lead screw shaft 36. The use of the compression spring 134 allows rapid and smooth engagement and disengagement of the mating spur gears without undue force.

Figure 9:
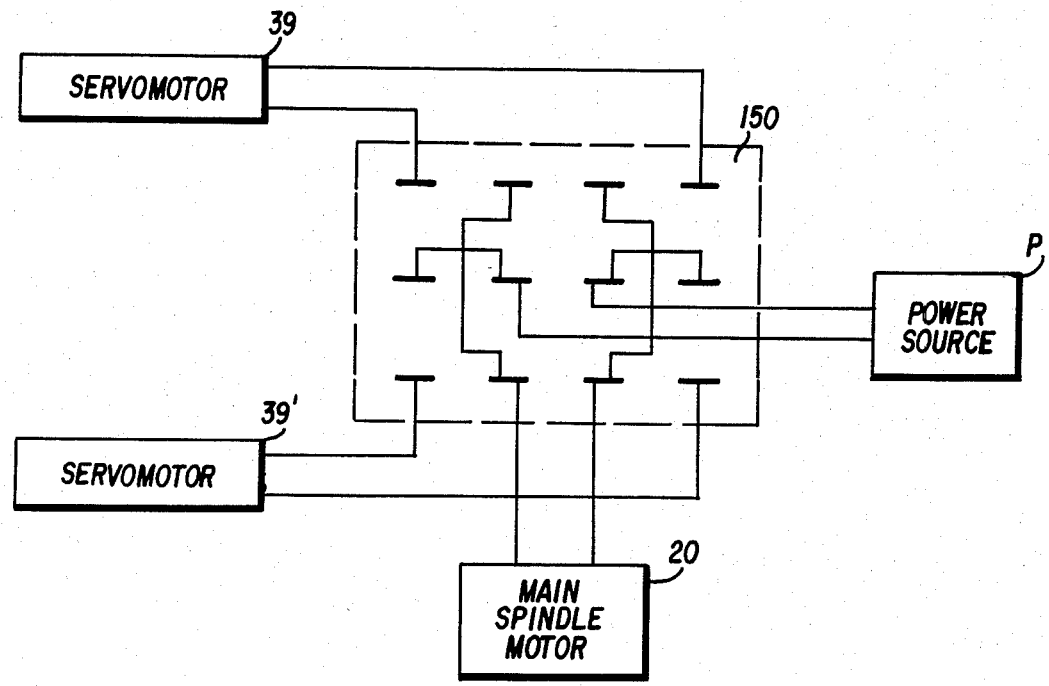
FIG. 9 is a schematic illustration of the switch connection between the power source and the lathe motors of the present invention.

A suitable servomotor which has been sucessfully used with the present invention is a Dayton Model No. 3M104 which is a fixed RPM motor of the shaded pole type. It is, of course, apparent that other types of servomotors may be employed in the present invention, including, but not limited to, capacitor type motors and motors having variable RPM. As shown in FIG. 9, the two servomotors 39, 39' and the main spindle motor 20 are connected to a conventional A.C. power source p by a single switch 150, preferably a four-pole double-throw switch with center off position. One switch that has been found suitable for use with the present invention is a McGill Model No. BP22 switch. The motors are connected to the switch 150 such that, in one operating switch position (the uppermost position shown in FIG. 9), power is transmitted to the main spindle motor 20 and a first one of the servomotors 39 and, in the other operating switch position (the lowermost position shown in FIG. 9), power is transmitted to the main spindle motor 20 and a second one of the servomotors 39'. Thus, only one servomotor can be electrically powered at any one time so that automatic compound tool feeds are precluded which is a desirable characteristic of special purpose machines of the type to which the present invention pertains.

From the foregoing description, it can be readily seen that each slide module is designed so that the respective slide elements 32, 32' can be moved either manually by the use of the hand wheels 38, 38' or automatically by independent servomotors 39, 39' of appropriate speed acting upon a lead screw of an appropriately selected pitch. Each slide element can be rapidly moved into proper position by the use of the associated hand wheel and the associated servomotor can be engaged at any point of travel of the slide element. The use of a servomotor for each of the slide modules provides precision tool movement in two independent axes with no mechanical drive train connection to the tool movement mechanism from the main spindle or the main spindle motor. In that way, a main drive motor of substantially smaller power rating can be utilized because the frictional losses in such a mechanical drive train connection are eliminated. Thus, both complexity and cost of the machine can be significantly reduced according to the present invention.

FIGS. 7 and 8 illustrate other types of arbors 18' and 18" which may be used with the present invention depending upon the particular type or design of component being machined. For example, arbor 18" is especially suited to the machining of armatures, whereas the arbors 18 and 18' are especially suited for machining brake drums, brake rotors or flywheels.

Although only a preferred embodiment is specifically illustrated and described herein, it will be appreciated that many modifications and variations of the present invention are possible in light of the above teachings and within the purview of the appended claims without departing from the spirit and intended scope of the invention.

We claim:

1. A special purpose lathe, especially for machining an automotive component, such as a brake drum or brake disc, comprising:
   a housing;
   a power source;
   spindle means rotatably mounted in said housing for supporting said component;
   a drive motor for rotatably driving said spindle means;
   a pair of slide modules mounted to the housing at right angles to one another, each slide module having a respective slide element shiftable in mutually perpendicular directions of movement;
   means mounted to one of said slide elements for supporting a tool holder;
   means associated with each slide element for selectively shifting the same in its respective direction of movement, said shifting means being independent of said spindle driving means, said shifting means comprising a servomotor mounted to each slide module and means for selectively connecting each servomotor to a respective slide element, each servomotor having an output shaft, said means for selectively connecting a servomotor to a slide element comprising a lead screw threadably engaged with the slide element, a first gear fixed to the lead screw, a second gear, means for non-rotatably fixing said second gear to the output shaft of the servomotor and for permitting axial sliding movement of said second gear along the output shaft and lever means engagable with said second gear for axially sliding said second gear into and out of meshing engagement with said first gear and means for resiliently biasing said second gear into meshing engagement with said first gear; and
   switch means connected to said power source for selectively applying the power source to said drive motor and servomotors, said switch means having a first position wherein said power source is applied to said drive motor and only one of said servomotors and a second position wherein said power source is applied to said drive motor and only the other of said servomotors whereby simultaneous movements of said slide elements are prevented.

2. A lathe according to claim 1, wherein said slide modules are of substantially identical construction.

3. A lathe according to claim 1, wherein each slide module includes handwheel means connected to said lead screw for manually rotating said lead screw.

4. A lathe according to claim 1, wherein said spindle means comprises a hollow shaft having an enlarged end, a female conical socket in said enlarged end, a workpiece arbor having a male conical part adapted to mate with said socket and drawbar means extending through said hollow shaft for drawing said male conical part into driving frictional engagement with said female conical socket, the included angle of said female conical socket and said mating male conical part being 60°.

5. A lathe according to claim 1, wherein said switch means comprises a four-pole double-throw switch with a center off position.

* * * * *